United States Patent
Hamalainen

(10) Patent No.: US 8,862,074 B2
(45) Date of Patent: Oct. 14, 2014

(54) ENERGY SAVING OPERATING OF POWER AMPLIFIERS IN COMMUNICATIONS NETWORKS

(75) Inventor: Seppo Olavi Hamalainen, Espoo (FI)

(73) Assignee: Nokia Siemens Network Oy, Espoo (FI)

( * ) Notice: Subject to any disclaimer, the term of this patent is extended or adjusted under 35 U.S.C. 154(b) by 179 days.

(21) Appl. No.: 13/123,775

(22) PCT Filed: Oct. 13, 2009

(86) PCT No.: PCT/EP2009/063348
§ 371 (c)(1),
(2), (4) Date: Aug. 26, 2011

(87) PCT Pub. No.: WO2010/043616
PCT Pub. Date: Apr. 22, 2010

(65) Prior Publication Data
US 2011/0306312 A1    Dec. 15, 2011

(30) Foreign Application Priority Data
Oct. 13, 2008    (EP) ..................................... 08017875

(51) Int. Cl.
*H04B 1/02* (2006.01)
*H04W 52/02* (2009.01)
*H04W 4/20* (2009.01)

(52) U.S. Cl.
CPC ............ *H04W 4/20* (2013.01); *H04W 52/0206* (2013.01); *Y02B 60/50* (2013.01)
USPC ............................................. 455/91; 455/574

(58) Field of Classification Search
CPC ........ H04L 1/0003; H04L 1/18; H04L 1/0026
USPC .......................................................... 455/91
See application file for complete search history.

(56) References Cited

U.S. PATENT DOCUMENTS

| 6,584,330 B1 * | 6/2003 | Ruuska .......................... 455/574 |
| 2005/0110565 A1 * | 5/2005 | Robinson ................... 330/124 R |
| 2013/0154889 A1 * | 6/2013 | Desclos et al. ................ 343/745 |

FOREIGN PATENT DOCUMENTS

| DE | 197 07 057 A1 | 9/1998 |
| GB | 2 446 438 A | 8/2008 |
| WO | WO 98/57516 | 12/1998 |
| WO | WO 02/07464 A1 | 1/2002 |

* cited by examiner

*Primary Examiner* — Ajibola Akinyemi
(74) *Attorney, Agent, or Firm* — Harrington & Smith

(57) ABSTRACT

The present invention refers to operating of power amplifiers of base stations in a communications network, wherein each power amplifier is assigned to a corresponding antenna of a base station and enables receiving and/or transmitting of information signals in an area of the communications network covered by the corresponding antenna. The operating includes switching off of a number of power amplifiers of a base station so that at least one power amplifier of the base station is left on, if level of load in the communications network is detected as being low; and switching of a signal of the at least one power amplifier to antennas, to which power amplifiers of the number of power amplifiers are assigned.

11 Claims, 2 Drawing Sheets

ENERGY SAVING OPERATING OF POWER AMPLIFIERS IN COMMUNICATIONS NETWORKS

FIELD OF THE INVENTION

The present invention relates to operating of power amplifiers in communications networks, wherein each power amplifier is assigned to a corresponding antenna of a base station and enables covering of a sector or a cell for receiving and/or transmitting of information signals in a communications network. In particular, the present invention relates to a method, a system, and an entity for operating of power amplifiers in communications networks. Further, the present invention is related to a power amplifier, a base station, a computer program product, and a data carrier. Additionally, the present invention is related to use of said method, said system, said entity, and said power amplifier for energy saving in communications networks.

BACKGROUND OF THE INVENTION

Energy saving has become one of key use cases in Self-organized Networks (SON) in communications networks like communications networks specified by the 3rd Generation Partnership Project (3GPP) or Next Generation Mobile Networks (NGMN), for example. In particular, the use case of energy saving concerns changing or adapting of network parameters during operational state of a communications network in such a way that energy consumption of network elements is minimized. In this way, also OPEX saving, e.g., through lower electricity consumption and bills, and environmental benefits like less $CO_2$ emission due to lower energy consumption, for example, are achieved.

Currently, multiple ways of achieving energy saving during operating of a communications network exist, in particular, for cases when load in the communications network decreases and is low (for example, during night).

One method providing most gain with regard to energy saving and being the most straightforward one is to shut down or to switch off an entire cell in a communications network if load in the communications network is low. However, in this way a coverage hole is created, which has to be detected and covered when operating the communications network correctly.

Covering of an area, left uncovered in the communications network by switching off or shutting down an entire cell, can be done by neighbouring cells, placed in sites neighbouring to the cell, which has been switched off or shut down. However, this is a complicated and challenging procedure as location of the coverage hole needs to be detected and as antenna tilt and direction of neighbouring cells need to be changed. Further, target for network planning is typically such that coverage of two cells has to be as little overlapping as possible. Thus, also recovering of the coverage hole represents a complicated task.

Therefore, there is still a need for further improvements with regard to methodologies of energy saving in communications networks, in particular, when the load in the communications network decreases and is low as it is the case during night, for example, when little communications traffic exist.

SUMMARY OF THE INVENTION

Object of the present invention is providing of an improved mechanism of energy saving in a communications network.

This object is achieved, for example, by a method, a system, an entity, a power amplifier, a base station, a computer program product, a data carrier, use of said method, use of said system, use of said entity, and/or use of said power amplifier, according to the claims appended hereto.

Further embodiments of the present invention are provided with the corresponding dependent claims.

The object of the present invention is achieved by a method for operating of power amplifiers of base stations in a communications network, wherein each power amplifier is assigned to a corresponding antenna of a base station and enables receiving and/or transmitting of information signals in area of the communications network covered by (a beam of) the corresponding antenna, and wherein the method comprises:

switching off of a number of power amplifiers of a base station so that at least one power amplifier of the base station is left on, if level of load in the communications network is detected as being low; and switching of a signal of the at least one power amplifier to antennas, to which power amplifiers of the number of power amplifiers are assigned.

In this way, coverage hole, which is first created by use of known methodologies and then detected and covered by complex, costly, and time-consuming steps of the known methodologies, is avoided in a simple way by the present invention. When a number of power amplifiers is switched off, the cell area covered by the number of power amplifiers for receiving and/or transmitting of information signals is covered by the at least one power amplifier, which was (were) left on. Now, the at least one power amplifier enables receiving and/or transmitting of information signals also in this area of the communications network.

The power amplifiers operated enable receiving and/or transmitting of information signals in a communications network, wherein each of the power amplifiers covers a sector or cell for receiving and/or transmitting of information signals at a corresponding antenna assigned to the power amplifier.

According to an embodiment of the present invention, the method comprises a selecting or adjusting of power of the at least one power amplifier so that coverage of cell area in the communications network after the switching off remains the same as before the switching off.

If power is kept in the original level, signal quality and used data rates lower (e.g., when adaptive modulation and coding is used)). Thus an adapting of the power of the at least one power amplifier, which was left on, can become useful, e.g., if signal quality and/or used data rates become too low. This is done by the selecting or adjusting of power of the at least one power amplifier.

However, here are also enough cases, where no adjusting of the power is necessary and where use of the same power (e.g., maximum or constant power) can be continued. Power of the at least one power amplifier is not altered, e.g., when lower data rates are to be used in cell border of each sector. Further, the power of the at least one power amplifier is not changed, for example, when the same coverage or cell areas is achieved but user data rates are smaller or when a low load case is provided, in which less power is sufficient.

According to an embodiment of the present invention, the method comprises a determining of the number of power amplifiers, wherein the determining is based on the level of load in the communications network.

According to an embodiment of the present invention, the level of load in the communications network is detected as being low if the level of load is smaller than a predetermined load level threshold value.

According to an embodiment of the present invention, the method is implemented on basis of a self organized network (SON). Here, SON enables automatic and autonomous functionality for the presented method.

The object of the present invention is achieved by a system for operating of power amplifiers of base stations in a communications network, wherein each power amplifier is assigned to a corresponding antenna of a base station and enables receiving and/or transmitting of information signals in an area of the communications network covered by (a beam of) the corresponding antenna, and wherein the system comprises:
- a module configured to switch off a number of power amplifiers of a base station so that at least one power amplifier of the base station is left on, if level of load in the communications network is detected as being low; and
- a module configured to switch a signal of the at least one power amplifier to antennas, to which power amplifiers of the number of power amplifiers are assigned.

The modules of the system are configured such that they perform the corresponding steps of the method already sketched above and described below in more detail.

Thus, according to an embodiment of the present invention, the system comprises a module configured to select or adjust power of the at least one power amplifier so that coverage of cell area in the communications network after the switching off remains the same as before the switching off.

The object of the present invention is achieved by an entity for operating of power amplifiers of base stations in a communications network, wherein each power amplifier is assigned to a corresponding antenna of a base station and enables receiving and/or transmitting of information signals in an area of the communications network covered by (a beam of) the corresponding antenna, and wherein the entity comprises:
- a module configured to switch off a number of power amplifiers of a base station so that at least one power amplifier of the base station is left on, if level of load in the communications network is detected as being low; and
- a module configured to switch a signal of the at least one power amplifier to antennas, to which power amplifiers of the number of power amplifiers are assigned.

In general, the modules of the (communications network) entity are configured such that they perform the corresponding steps of the method already sketched above and described below in more detail.

Thus, for example, according to an embodiment of the present invention, the entity comprises a module configured to select or adjust power of the at least one power amplifier so that coverage of cell area in the communications network after the switching off remains the same as before the switching off.

The object of the present invention is achieved also by a power amplifier, wherein the power amplifier is configured to be operated by use of the method already sketched above and described below in more detail.

Further, the object of the present invention is achieved also by a base station, wherein the base station comprises said power amplifier.

Additionally, the object of the present invention is achieved by a computer program product comprising a code, said code being configured to implement the method already sketched above and described below in more detail.

According to an embodiment of the present invention, said code is embodied on a data carrier.

According to an embodiment of the present invention, said computer program product is configured to perform said method when the computer program product is executed by a processing unit.

According to an embodiment of the present invention, the method is implemented on basis of a self organized network (SON).

The object of the present invention is achieved also by a data carrier comprising said computer program product.

Furthermore, the object of the present invention is achieved also by use of said method, said system, said (network) entity, and/or said power amplifier for energy saving in a communications network. Thus, said method, system, (network) entity, basis station, computer program product, and/or data carrier enable energy saving operating of power amplifiers of base stations in communications networks.

By the present invention, an improved mechanism of energy saving in a communications network is provided. The present invention makes available an effective way of energy saving, wherein targets set out for network planning are taken into account at the same time.

By use of the present invention the generation and the complex and expensive handling coverage hole is avoided in an effective and simple way. Thus, performance of operating of a communications network and its entities is improved with regard to both the energy saving in the communications network and the efficiency and costs needed for the operating.

BRIEF DESCRIPTION OF THE DRAWINGS

The present invention will be more clearly understood from the following description of embodiments of the invention read in conjunction with the attached drawings, in which.

DESCRIPTION OF THE EMBODIMENTS

Figure 1:
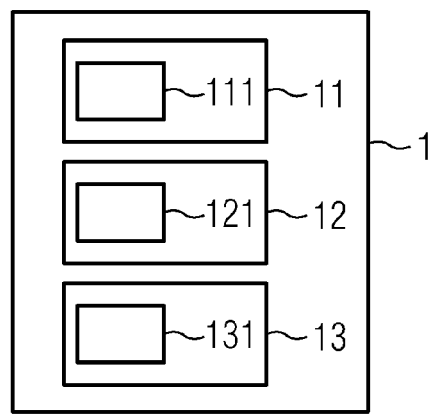
FIG. 1 shows a base station provided according to an embodiment of the present invention.

FIG. 1 shows a base station provided according to an embodiment of the present invention. In particular, the base station 1 comprises antenna elements 11, 12, 13 and power amplifiers 111, 121, 131, wherein to each antenna element 11, 12, 13 a corresponding power amplifier is assigned. Thus, according to the present embodiment each antenna element 11, 12, 13 has one power amplifier 111, 121, 131. By use of an antenna element 11, 12, 13 and a corresponding power amplifier 111, 121, 131 a cell area for receiving and/or transmitting of (information or data) signals is covered by the base station 1. The antenna element 11, 12, 13 and the corresponding power amplifier 111, 121, 131 enable covering of this cell area for receiving and/or transmitting of the (information or data) signals.

The power amplifiers 111, 121, 131 are configured to be operated according to the present invention.

Figure 2:
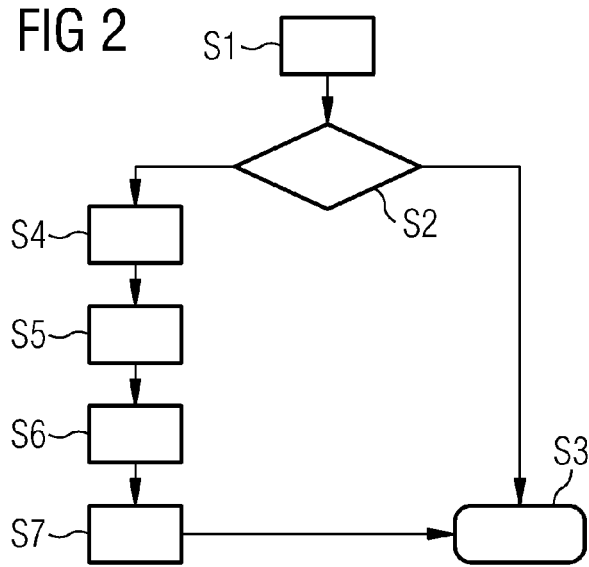
FIG. 2 shows steps of a method for operating power amplifiers according to an embodiment of the present invention.

FIG. 2 shows steps of the method for operating power amplifiers according to an embodiment of the present invention.

In step S1, load level in the communications network is detected. Load level can be detected, e.g., from use of Physical Resource Blocks, PRBs (in case of 3GPP LTE). If the number of used PRBs is low, the communications system is lowly loaded. Another method to detect the load level is to observe packet scheduling queue. If the queue of un-send packets to users is getting long, it can be assumed that cell is getting highly or over loaded. Here a variety of approaches of how to determine the level of load and/or of how to determine that a low level of load in a communications system is occurred are possible.

In step S2, it is checked whether the load level of the communications network is low. Here, information like intermediate load level or maximal load level can be used, for example. Further, when checking S2 the load level, a threshold value can be used. If the level of load in the communications network is greater than (or equal to) the predetermined threshold value, the level of load is identified or detected as being appropriate for operating of power amplifiers without further changes of their operating modus or status. Thus, the method is completed S3. However, if the level of load in the communications network is smaller than the predetermined threshold value, the level of load is identified or detected as being low.

If the level of load is identified or detected as being low, operation of the power amplifiers can be performed in a more energy saving way. According to the present embodiment, in step S4 a number of power amplifiers, which can be switched off, is identified or determined, wherein at least one power amplifier has to be left on.

Here, the number of shut down power amplifiers can be decided based on loading situation in the communications network. E.g., in a base station comprising three power amplifiers (and, thus, three antennas), when the load corresponds roughly to an intermediate load in the communications network, one power amplifier of the three power amplifiers can be shut down or switched off. When the load is identified as being lower than the intermediate load, two of the three power amplifiers can be shut down or switched off.

In step S5, the number of power amplifiers is switched off, wherein at least one power amplifier is left on at the same time.

In step S6, signal of the at least one power amplifier, which has been left on, and, thus, of an active power amplifier is switched to antennas assigned to power amplifiers, which were switched off. Antenna switching can be implemented, for example, by connecting of each power amplifier to each antenna, wherein a switching circuitry can be used for this purpose. When a power amplifier is switched off, signal from another power amplifier is switched to antenna by using the switching circuitry. Therefore in this case the same radio signal is radiated from two antennas. Here, it has to be noted that this way of switching is provided exemplary and that the present invention is not limited to this way of switching only.

In step S7, power of the active power amplifier is selected or adjusted so that coverage of cell area in the communications network after the switching off in step S5 remains the same as before the switching off in step S5. Here, for example, in a low load situation, power which is lower than maximum power may be used in different power amplifiers. When an amplifier is switched off and a signal form another power amplifier switched to the antenna, to which the switched of amplifier is assigned, the used power is increased with regard to the amount used in switched-off cell.

Then, in step S3, the method is completed and an energy saving operating of power amplifiers of the base station and, thus, of the base station itself is enabled.

Figure 3:
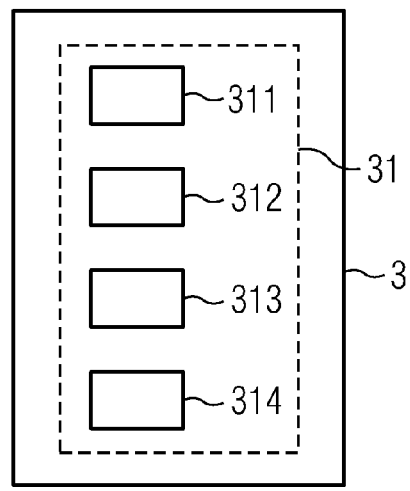
FIG. 3 shows structure of a system or an entity provided according to an embodiment of the present invention.

FIG. 3 shows a system or an entity 3 provided according to an embodiment of the present invention. As both the system and the entity 3 are configured to implement and perform the steps of the method for operating power amplifiers of base stations in communications network, the configuration of a set 31 of modules 311, 312, 313, 314 of the system and the entity 3 can be performed in similar ways.

In FIG. 3, the modules 311, 312, 313, 314 are provided as separate modules for a better understanding of the present invention. However, also combining of these modules in one module is possible according to the present invention. Further, the modules can be configured to perform also further functionalities or tasks in the communications network.

According to the present embodiment, a determining module 311 is provided, which is configured to determine a number of power amplifiers to be switched off, as sketched above and described below. Further, the a set 31 of modules comprises a switching off module 312, which is configured to switch off the number of power amplifiers of a base station so that at least one power amplifier of the base station is left on, if level of load in the communications network is detected as being low, as sketched above and described below. Moreover, a switching module 313, which is configured to switch a signal of the at least one power amplifier to antennas, to which power amplifiers of the number of power amplifiers are assigned, as sketched above and described below, is provided.

Additionally, the set 31 of modules comprises a selecting or adjusting module 314 configured to select or adjust power of the at least one power amplifier so that coverage of cell area in the communications network after the switching off remains the same as before the switching off, as sketched above and described below.

Figure 4A:
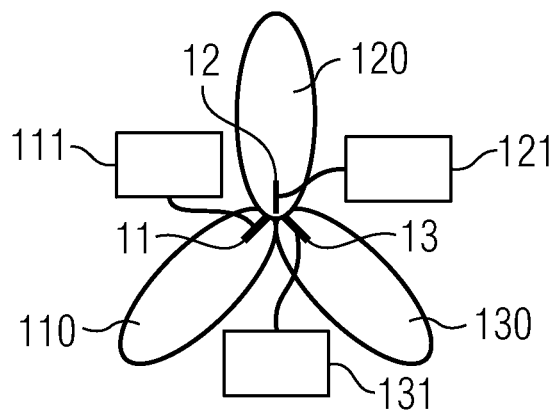
FIGS. 4a, 4b, 4c show operating of power amplifiers according to an embodiment of the present invention.
Figure 4B:
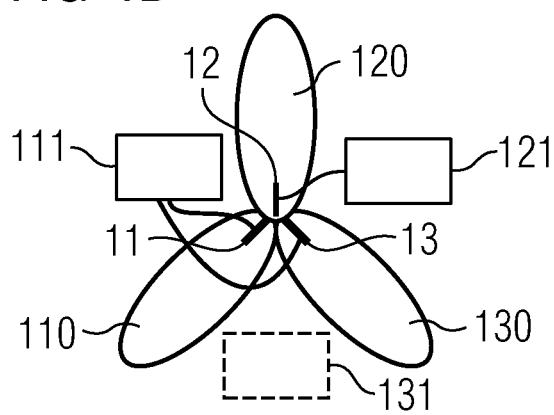
Figure 4C:
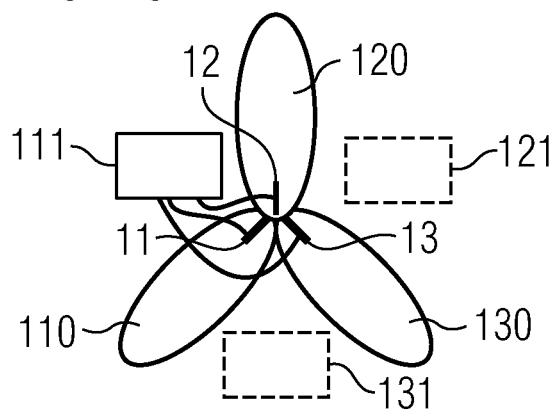

In FIGS. 4a, 4b, and 4c operating of power amplifiers according to an embodiment of the present invention is presented. In particular, according to the present embodiment three power amplifiers 111, 121, 131 and three antennas 11, 12, 13 of a base station as provided exemplary by FIG. 1 are operated.

In FIG. 4a, a normal or usual situation of operating of the base station and the power amplifiers 111, 121, 131 in a communications network is shown. Signals and power of each of the power amplifiers 111, 121, 131 are lead to the corresponding antennas 11, 12, 13 to enable receiving and/or transmitting of information signals in corresponding cell areas 110, 121, 130 covered by the antennas 11, 12, 13. This is visualised by the lines connecting the power amplifiers 111, 121, 131 with the corresponding antennas 11, 12, 13 covering cell areas or sectors 110, 121, 130.

In FIG. 4b, the power amplifier 131 is switched off (visualized by dashed lines of frame), as the level of load has been identified as being low, e.g., as corresponding to an intermediate load in the communications network, for example. Thus, according to FIG. 4b, the signals and power of the active power amplifier 111 are lead or switched also to antenna 13 to enable receiving and/or transmitting of information signals also in the cell area or sector 130 covered by the antenna 13. This is presented in FIG. 4b, by line connecting the active power amplifier 111 and the antenna 13.

According to embodiment of FIG. 4c, two power amplifiers 131 and 121 are switched off (visualized by dashed lines of frame), as the level of load has been identified as being low. According to this embodiment, the signals and power of the active power amplifier 111 are lead or switched also to antennas 12 and 13 to enable receiving and/or transmitting of information signals also in the cell areas or sectors 120, 130 covered by the antennas 12 and 13. This is visualized in FIG. 4c, by lines connecting the active power amplifier 111 and the antennas 12 and 13.

Typically, power amplifiers are switched off only when low loading in the network, e.g. during night. If an interference limited system and a low load situation with 10 W output power per power amplifier is given, then the total input power is for example 115 W. Due to signal processing, fans and other circuitry the base station consumes a certain minimum power despite of output power, for example 35 W. In a base station with a 3-sector system as provided exemplary above, the total input power for site is 3×115=345 W.

If a situation is provided, in which two of three power amplifiers can be switched off and the remaining active power amplifier has to cover cell areas of the two power amplifiers switched off, then the output power becomes equal to 3×10 W=30 W. For 30 W output power the total input power of a power amplifier is for example 170 W. Power saving is then (345−170)/345%~50%. This naturally holds with low load assumptions made above.

Thus, the present invention refers to operating of power amplifiers of base stations in a communications network, wherein each power amplifier is assigned to a corresponding antenna of a base station and enables receiving and/or transmitting of information signals in an area of the communications network covered by the corresponding antenna. The operating comprises switching off of a number of power amplifiers of a base station so that at least one power amplifier of the base station is left on, if level of load in the communications network is detected as being low; and switching of a signal of the at least one power amplifier to antennas, to which power amplifiers of the number of power amplifiers are assigned.

In this way, the present invention provides the advantage that no coverage holes are generated but exactly the same coverage of cell areas is resulted as in original situation. An alternative way could use neighbouring cells to cover area left uncovered after switching cell off. However, this is problematic as a correct network planning tries to avoid overlapping coverage (i.e., antenna tilting, antenna directions).

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. It is therefore intended that the foregoing detailed description is to be regarded as illustrative rather than limiting and that it is understood that it is the following claims including all equivalents described in these claims that are intended to define the spirit and the scope of this invention. Nor is anything in the foregoing description intended to disavow the scope of the invention as claimed or any equivalents thereof.

REFERENCE LIST 1 a base station
11 antenna of a base station
12 antenna of a base station
13 antenna of a base station
110 a cell area covered by an antenna of a base station
120 a cell area covered by an antenna of a base station
130 a cell area covered by an antenna of a base station
111 a power amplifier
121 a power amplifier
131 a power amplifier
S1 detecting of a load level of a communications network
S2 checking step
S3 completing step
S4 determining of a number of power amplifiers
S5 switching off of a number of power amplifiers
S6 switching of a signal
S7 increasing of power of a power amplifier
3 a system or an entity
31 a set of modules
311 a module
312 a module
313 a module
314 a module

The invention claimed is:

1. A method for operating power amplifiers of base stations in a communications network, the method comprising:
assigning each of a plurality of power amplifiers to a corresponding antenna of a base station, such that a first power amplifier is assigned to a first antenna and a second power amplifier is assigned to a second antenna for enabling receiving of information signals in an area of the communications network covered by the corresponding antenna, or for enabling transmitting of information signals in the area of the communications network covered by the corresponding antenna, or for enabling both receiving and transmitting of information signals in the area of the communications network covered by the corresponding antenna;
switching off one or more of the plurality of power amplifiers so that at least one power amplifier of the base station is left on, in response to a level of load in the communications network being detected as low; and
switching an output signal of the at least one power amplifier which has been left on from the first antenna to the second antenna, wherein the second antenna was assigned to the one or more power amplifiers that were switched off.

2. The method according to claim 1, wherein the method comprises a selecting of power of the at least one power amplifier so that coverage of cell area in the communications network after the switching off remains the same as before the switching off.

3. The method according to claim 1, wherein the method comprises a determining of the number of power amplifiers and wherein the determining is based on the level of load in the communications network.

4. The method according to claim 1, wherein the level of load in the communications network is detected as being low if the level of load is smaller than a predetermined load level threshold value.

5. The method according to claim 1, wherein the method is implemented on behalf of a self organized network.

6. The method of claim 1 wherein the switching off of one or more power amplifiers is performed for energy saving in a communications network.

7. An apparatus comprising one or more processors and one or more memories including computer program code, the one or more memories and the computer program code configured, with the one or more processors, to cause the apparatus to perform at least the following:
assigning each of a respective plurality of power amplifiers to a corresponding antenna of a base station, such that a first power amplifier is assigned to a first antenna and a second power amplifier is assigned to a second antenna;
switching off one or more power amplifiers of the respective plurality of power amplifiers so that at least one power amplifier of the respective plurality of power amplifiers is left on, in response to a level of load in a communications network being detected as low; and
switching an output signal of the at least one power amplifier which has been left on from the first antenna to the second antenna, wherein the second antenna was assigned to the one or more power amplifiers that were switched off.

8. The apparatus of claim 7, wherein the apparatus further performs selecting a power level for the at least one respective power amplifier so that coverage of a cell area in the communications network subsequent to the switching off remains the same as prior to switching off.

9. A non transitory computer program product comprising a code, the code being configured to implement a method comprising:

assigning each of a respective plurality of power amplifiers to a corresponding antenna of a base station to enable receiving of information signals in an area of a communications network covered by the corresponding antenna, or to enable transmitting of information signals in the area of the communications network covered by the corresponding antenna, or to enable both receiving and transmitting of information signals in the area of the communications network covered by the corresponding antenna; such that a first power amplifier is assigned to a first antenna and a second power amplifier is assigned to a second antenna;

switching off at least one power amplifier of a base station so that at least one power amplifier of the base station is left on, if a level of load in the communications network is detected as being low; and switching an output signal of the at least one power amplifier which has been left on from the first antenna to the second antenna, wherein the second antenna was assigned to the one or more power amplifiers that were switched off.

10. The computer program product according to claim 9, wherein the computer program product is configured to perform the method when the computer program product is executed by a processing unit.

11. The computer program product according to claim 9, wherein the method is implemented on behalf of a self organized network.

* * * * *